United States Patent [19]

Watkins et al.

[11] Patent Number: 4,614,236
[45] Date of Patent: Sep. 30, 1986

[54] SELF-BREAKING FOAMED OIL-IN-WATER EMULSION FOR STIMULATION OF WELLS BLOCKED BY PARAFFINIC DEPOSITS

[75] Inventors: David R. Watkins, Irvine; Edward J. O'Donnell, Huntington Beach, both of Calif.

[73] Assignee: Union Oil Company of California, Los Angeles, Calif.

[21] Appl. No.: 614,976

[22] Filed: May 29, 1984

[51] Int. Cl.$^4$ .......................... B08B 3/08; E21B 21/14
[52] U.S. Cl. ...................................... 166/304; 134/36; 134/40; 166/309; 166/312; 252/8.552
[58] Field of Search ...................... 252/8.55 B, 8.55 R, 252/547; 166/274, 304, 309, 312, 369, 370; 134/22.12, 22.14, 22.18, 22.19, 36, 40

[56] References Cited

U.S. PATENT DOCUMENTS

| | | | |
|---|---|---|---|
| 3,037,887 | 6/1962 | Brenner et al. | 134/36 X |
| 3,076,508 | 2/1963 | Lissant | 252/8.55 B X |
| 3,120,266 | 2/1964 | Martin et al. | 166/309 |
| 3,174,929 | 3/1965 | Anderson | 252/8.55 B |
| 3,241,614 | 3/1966 | Bertness . | |
| 3,402,770 | 9/1968 | Messenger . | |
| 3,436,262 | 4/1969 | Crowe et al. | 134/36 X |
| 3,463,231 | 8/1969 | Hutchison et al. | 166/371 X |
| 3,486,560 | 12/1969 | Hutchison et al. | 166/309 X |
| 3,637,021 | 1/1972 | Hutchison et al. | 134/36 X |
| 3,700,594 | 10/1972 | Lissant | 252/8.55 B |
| 3,724,553 | 4/1973 | Snavely, Jr. et al. | 166/304 |
| 3,794,523 | 2/1974 | Thompson | 252/8.55 C X |
| 3,863,717 | 2/1975 | Cooper | 166/279 |
| 4,033,784 | 7/1977 | Lawson et al. | 134/40 X |
| 4,089,703 | 5/1978 | White | 166/304 X |
| 4,113,631 | 9/1978 | Thompson | 252/8.55 R X |
| 4,201,678 | 5/1980 | Pye et al. | 252/8.55 R X |
| 4,207,193 | 6/1980 | Ford et al. | 166/304 X |
| 4,301,868 | 11/1981 | Scherubel et al. | 252/8.55 B X |
| 4,457,375 | 7/1984 | Cummins | 166/309 |

Primary Examiner—George A. Suchfield
Attorney, Agent, or Firm—Dean Sandford; Gregory F. Wirzbicki; June M. Bostich

[57] ABSTRACT

A self-breaking, foamed, oil-in-water emulsion contains a water-immiscible organic solvent for paraffins and asphaltenes, an aqueous nonformation-damaging component, an inert gas, and surface active agents selected to promote a stable foamed emulsion despite contact of the treating fluid with the hydrocarbon and aqueous environment in the reservoir. Under conditions of agitation, the treating fluid is a stable foamed emulsion which undergoes spontaneous breakdown into two liquid phases under quiescent conditions. The treating fluid is injected and/or circulated as a stable foamed emulsion to dissolve paraffin and asphaltene-containing deposits from various substrata, such as a subterranean reservoir penetrated by a well, the well itself, or an industrial vessel or conduit. When injection or circulation is stopped, the foamed emulsion spontaneously breaks down so that the treating fluid can be readily pumped from the well.

56 Claims, No Drawings

SELF-BREAKING FOAMED OIL-IN-WATER EMULSION FOR STIMULATION OF WELLS BLOCKED BY PARAFFINIC DEPOSITS

BACKGROUND OF THE INVENTION

This invention relates to the treatment of a subterranean petroleum-containing formation penetrated by a well with a treating fluid capable of dissolving materials present in or on the substrata. More particularly, this invention relates to the treatment of a well or subterranean formation to remove petroleum waxes commonly known as "paraffin deposits," which may contain asphaltene components, to increase the permeability therethrough. This invention also relates to the cleaning of industrial vessels and conduits to remove paraffin deposits therefrom.

In the course of producing certain types of petroleum oils and gases from subterranean formations penetrated by a well, paraffins and asphaltenes deposited from the oil tend to clog the pores of the reservoir rock, the well casings, and the tubings and screens through which the oil and gas flow to the surface. The deposition of paraffins may proceed to the point that production is completely interrupted.

In the past, the problem of removing paraffin deposits has been approached in various ways. The oldest method, and perhaps the most effective heretofore, was to clean the wellbore mechanically, as for example, by scraping. This method, however, was too expensive to be economically feasible as it resulted in lost production time, additional rig time, and high costs for labor and mechanical tools. Moreover, scraping could not reach deposits left behind the well casing or within the producing formation.

Another common practice to remove paraffin deposits employs chemical solvents to restore flow to a plugged formation and wellbore. Solvents customarily used to dissolve paraffins and asphaltenes include benzene derivatives, gasoline, distillates, carbon tetrachloride and carbon disulfide. Usually hot oil or solvent is injected as a liquid to dissolve the paraffins and other soluble hydrocarbons. But removal of soluble paraffins and other hydrocarbons by solvent injection poses two problems. First, the condition of the well may actually be worsened if insoluble, soil-like constituents of the sludge fouling the well remain behind after the treatment in higher concentrations than before the solvent injection was performed. Second, solvents may become excessively diluted during injection by contamination with reservoir fluids before they reach the zone of plugging since paraffins form in the lower portion of the well.

Other methods of removing paraffins from producing wells require heat generation in situ to dissolve the paraffinic components of deposits. The method used may rely upon heat generated by the exothermic neutralization reaction of alternately administered slugs of acid and base solutions. Or a hot, foamed detergent may be generated in situ by administering alternate slugs of alkali metasilicate, or similar detergents, and concentrated sulfuric acid solutions containing a foam stabilizer. The latter method is disclosed in U.S. Pat. No. 4,089,703 to White.

One of the most effective solvents for paraffins of varying compositions is carbon disulfide. But carbon disulfide is difficult and hazardous to use because it is highly toxic, flammable, and volatile. As it is also readily soluble in oil, carbon disulfide is difficult to place deep into wells containing a standing column of oil. To reduce the hazards associated with using carbon disulfide, Rowlinson in U.S. Pat. No. 3,375,192 discloses a mixture for use in cleaning oil wells comprising 8 to 16 volume percent of pentane and the balance of carbon disulfide. The pentane is used to raise the ignition temperature of the carbon disulfide and thereby reduce the fire hazard associated with its use.

U.S. Pat. No. 3,241,615 to Bertness discloses a process of removing hydrocarbon accumulation from within the wellbore by contacting the substrata with a liquid mixture comprising a surfactant and a solvent such as carbon disulfide and flushing with water to disperse the paraffins. A mixture of water with the solvent-surfactant solution is also contemplated.

Solvent emulsions have also been employed to remove paraffins from plugged wellbores and oil well tubings. In U.S. Pat. No. 2,358,665 to Shapiro, a method is described in which oil immiscible solvent emulsions having a specific gravity greater than oil sink through the oil column until, having reached the temperature at which they become unstable, they break, releasing the undiluted solvent to dissolve the waxes upon contact. This method solves the problem of getting the solvent into the lower region of the oil column without dilution, but makes release of the solvent depend upon the temperature profile in the reservoir. A method to remove dependence of the point of solvent release upon temperature in the wellbore is disclosed in U.S. Pat. No. 3,724,553 to Snavely. A thermally stable oil-in-water emulsion of a mixture of solvents for paraffins is broken to release the solvents by contacting the aqueous phase with salt injected into the well either before or after injection of the emulsion. However, this method possesses the disadvantage of potential damage to the reservoir from the addition of salts.

Foams minimize the volume of treating fluid required while simultaneously reducing the density of the treating fluid. A foaming agent and a gas are commonly added to a liquid treating fluid to form a relatively large volume of foamed treating fluid from a small amount of solvent and additives. U.S. Pat. No. 3,572,439 to Hutchinson et al. discloses a preformed well circulation foam containing water or water-cosolvent mixtures stabilized by ammoniated concentrates of organic foaming agents. Use of a mixture of foaming agents is also contemplated.

Generation and maintenance of foam is not difficult when the fluid to be contacted or displaced is either water or a variety of brines. Contact with crude oil, however, depresses many foams. On the other hand, water-free foamed solvents often form viscous water-in-oil emulsions upon contact with water. Use of a foamed solvent, therefore, may cause blocking of the formation in situ when it mixes with reservoir waters, and removal of the emulsion from the wellbore may prove difficult.

The use of oil-in-water emulsions may also be injurious to certain formations that contain clays or bentonitic shale. Introduction of foreign water into an argillaceous reservoir causes certain clays and bentonitic shales to swell due to ion exchange between non-ionically balanced injection water and the formation. Since swelling is pH sensitive, it is well known to acidify foreign waters to counteract the loss in permeability which results from such swelling. However, acidic waters, even if used in solvent emulsions, pose the disadvantage of being extremely corrosive to metal unless expensive corrosion inhibitors are added.

Certain reservoir formations containing iron-bearing minerals are also damaged by deposition of iron-bearing precipitates within the formation if a solvent-containing fluid useful for removing paraffin deposits is used in conjunction with an acidic component for dissolving carbonate or silicate deposits. Acidification of solvent-containing fluids is common since carbonates and iron-containing minerals are among the deposits most commonly dissolved from wells. However, at the wellbore pressures necessary to prevent blowouts in active reservoirs, stimulation fluids travel outwardly from the wellbore into the formation. Carbonates and iron-bearing components dissolved by the acidic components in the well-treating fluid travel outwardly from the well and tend to precipitate from solution as the travelling fluid contacts basic elements in the formation or becomes diluted with formation waters. In certain clay or sandstone formations containing iron-bearing minerals, such as chlorite, or iron carbonates, such as ferroin, ferroin dolomite, and siderite, an acid component in the treating fluid results in redeposition of iron materials at locations deeper in the reservoir which have been dissolved from plugging components near the wellbore.

Interest has long been shown in developing an economical composition for stimulating production in low pressure stripper wells blocked by paraffin deposits. Stripper wells are characterized by depleted formation pressures caused by extended production. High density treating fluids therefore create wellbore pressures sufficient to result in excessive loss of treatment fluids into the formation during treating. Moreover, sludge remaining after paraffins and asphaltenes have been dissolved can be forced deep into the formation by the higher pressure in the wellbore and result in severe plugging difficult to reach by subsequent cleaning procedures. If the treating fluid is also acidified to dissolve carbonates and silicates, iron-bearing deposits can reinforce the plug in the formation and virtually close in the reservoir.

The need has long been felt in the art for an inexpensive and effective well treating fluid useful for dissolving paraffin deposits which is neither explosive nor dependent upon the thermal gradient in the reservoir, and which will not cause salt damage to the formation by ion exchange with clays contained therein. Additionally, a composition useful for dissolving paraffin deposits from formations containing iron-bearing minerals that will not cause redeposition within the reservoir of iron containing deposits has long been sought in the art.

It is an object of this invention to provide a composition comprising a foamed oil-in-water emulsion of solvent in non-formation damaging aqueous solution which is useful for cleaning paraffin deposits from the wellbore, formation rock, or gravel pack of wells without damage to the surrounding formation.

It is a further object of this invention to provide a cost-efficient method of removing paraffin deposits in which the volume of solvent used to dissolve a given quantity of paraffin deposits is minimized and loss to the formation of the stimulation fluid is avoided.

An additional object of this invention is to provide a low density, foamed solvent emulsion which is stable while removing paraffin deposits from the wellbore and surrounding formations under agitated conditions but which breaks down spontanously under quiescent conditions to form a liquid phase easy to remove from the wellbore.

Yet another object of this invention is to provide a method for removing paraffin deposits from depleted stripper wells in which formation pressure is used to assist in cleaning the residue of dissolved deposits from the well.

It is still another object of this invention to provide a foamed solvent emulsion that maintains a stable viscosity during injection and circulation when crude oil or formation water is contacted or when asphaltenes and other natural emulsifiers are dissolved during treatment.

Additional objects, advantages and features of the invention will become apparent to those skilled in the art from the following description.

SUMMARY OF THE INVENTION

Briefly, this invention provides a process for removing paraffinic hydrocarbon deposits from subterranean locations such as formation rock, wellbores, or gravel pack of wells, said process comprising (1) preparing a foamed emulsion remote from said subterranean locations and (2) injecting said foamed emulsion into said wellbore, said emulsion comprising (a) an organic solvent for paraffins, (b) an aqueous liquid component, (c) an inert gas, and (d) a surface active agent.

Alternatively a process for removing paraffinic hydrocarbon deposits from subterranean locations penetrated by a wellbore comprises injecting into the wellbore a treating composition comprising (a) an organic solvent for paraffins, (b) an aqueous liquid component, (c) an inert gas, and (d) sufficient of a surface active agent to maintain said composition as a foamed oil-in-water emulsion under conditions of agitation, but to allow spontaneous degassing and separation of said composition into two substantially continuous liquid phases upon standing.

In another embodiment, a composition useful for dissolving paraffinic hydrocarbon deposits from subterranean locations penetrated by a wellbore is provided, said composition comprising (1) a continuous nonacidic aqueous phase having non-reservoir damaging properties, (2) a discontinuous solvent phase immiscible with said aqueous phase, said solvent being effective for dissolving paraffins, (3) a discontinuous gaseous phase comprising inert gas, and (4) sufficient of a surface active agent selected to maintain said composition as an emulsion under conditions of agitation but to allow separation of the composition into two continuous liquid phases under conditions of quiescence.

In yet another embodiment, a foamed oil-in-water emulsion for cleaning paraffin deposits from subterranean locations penetrated by a wellbore is provided, said foamed emulsion comprising an organic solvent for paraffins and a non-acidic aqueous liquid containing not less than 2,000 ppm by weight of dissolved ionic components, and sufficient of a surface active agent selected to maintain the stability of said foamed emulsion under conditions of agitation while allowing said foamed emulsion to degas and separate into two substantially continuous liquid phases under relatively quiescent conditions.

A process for forming the well treatment fluid referred to above comprises (1) emulsifying finely divided droplets of a hydrocarbon-dissolving solvent in a continuous aqueous phase having non-reservoir-damaging properties to form an oil-in-water emulsion, and (2) forming a stable foam from the emulsion by turbulently contacting the foam with a stream of inert gas, the foamed emulsion maintaining stability under conditions of agitation and undergoing relatively rapid and substantial breakdown into two liquid phases under conditions of rest. The preferred way to disperse the droplets in step (1) and to form the foam in step (2) is by adding at least one surface active agent partially soluble in said continuous aqueous phase.

The foamed treating emulsion can be used to increase the permeability of subterranean reservoirs and filter media present in wells penetrating such subterranean reservoirs, and to remove paraffin deposits from industrial vessels and conduits.

DETAILED DESCRIPTION OF THE INVENTION

The present invention is directed to foamed emulsion compositions for dissolving paraffin-containing and/or paraffin and asphaltene-containing materials, and to methods for using such compositions. The invention finds its primary utility in treating subterranean formations, well casings, and the like, which are plugged or contain substantial deposits of a paraffinic character. In a specific embodiment of the invention, to be described in greater detail hereinafter, the method and compositions of the invention are useful in treating stripper wells without substantial loss of treating fluids into the formation.

More particularly, the treating fluid is a foamed emulsion comprising an organic solvent for dissolving paraffins, and preferably also asphaltenes, an aqueous liquid, an inert gas, and sufficient of a surface active agent to maintain the stability of the treating fluid as a foamed emulsion under conditions of agitation while allowing said foamed emulsion to degas and separate into two continuous liquid phases under quiescent conditions. Typically and preferably, the aqueous liquid is nonacidic and nonformation-damaging, and the emulsion comprises discontinuous gaseous and solvent phases within the aqueous phase. Also, in use in a formation, the treating fluid usually comprises, as liquids, about 0.5 to 70, preferably 5 to 30, volume percent of the solvent phase, about 30 to 99, preferably 75 to 95, volume percent of the aqueous phase, and about 0.01 to 10, preferably 0.01 to 4, volume percent of the surface active agent. In the foamed state, the treating fluid contains a gaseous component usually in a concentration of about 1 to 95, preferably 30 to 93, volume percent of the treating fluid.

The gas used to generate the foam can be any inert gas, although it is preferred to use an easily available gas such as nitrogen. Although stimulation fluids are commonly foamed by pumping a gas containing a combustion-supporting component, such as air, into the fluid and agitating the mixture, the danger of a spark igniting volatile hydrocarbon vapors in the well and surrounding areas makes the use of combustion-supporting gases hazardous. The present invention advantageously removes this hazard from the drilling site by using an inert gas to build and support the foamed emulsion.

The aqueous component can be fresh water but is preferably a brine formulated by adding to water sufficient of a salt which prevents the swelling of clays, i.e., by adding sufficient quantities of such salts to match the ionic strength of the brine to that of the connate reservoir waters and thus render the brine nonformation-damaging. Typically, it will be found that, to prevent formation damage, the aqueous component of the treating fluid of the invention will contain at least 2,000 ppmw of a salt which prevents the swelling of clays in the formation. Potassium chloride is the preferred salt for this purpose, but sodium chloride is also suitable. Alternatively, connate waters withdrawn from the reservoir can be used as the aqueous component of the foamed emulsion.

The organic solvent component used in the foamed emulsion composition can be a hydrocarbon solvent, halogenated hydrocarbon, or a polar solvent or mixtures thereof, which solvents are capable of dissolving paraffins and preferably both paraffins and asphaltenes to at least some extent. Preferably the solvent component will have a high flash point and low volatility. Solvents which react with water to form acids or acid precursors should be avoided in the practice of this invention.

Hydrocarbon solvents such as petroleum solvents, petroleum ether, petroleum naphtha, gasoline, petroleum spirit, varnish makers' and painters' naphtha, mineral spirits, kerosene, turbine fuel, high solvency petroleum naphthas, butanes, 2,2-dimethylbutane, n-hexane, isohexane, n-heptane, isooctane, isoheptane, pentene-1, pentene-2, mixed pentenes, isoheptene, isooctenes, naphthas, benzene, toluene, toluene substitutes, xylene, solvent naphthas, ethylbenzene, diethylbenzene, isopropylbenzene, amylbenzene, diamylbenzene, triamylbenzene, tetra amylbenzene, dikerylbenzene-12, amyltoluene, cyclohexane, methylcyclohexane, tetrahydronaphthalene, decahydronaphthalene, diphenyl, coal-tar creosote, turpentine, terpene solvents, dipentene, pinene, p-cymene, p-methane, pine oils, tall oils, and crude oils are suitable.

Halogenated hydrocarbons such as dichloromethane, carbon tetrachloride, ethyl chloride, ethylene chlorobromide, ethylene dichloride, dichloroethylene, B-trichloroethane, trichloroethylene, trichloroethane, 1,1,2,2-tetrachloroethane, tetrachloroethylene, pentachloroethane, hexachloroethane, isopropyl chloride, allyl chloride, propylene dichloride, mixed amyl chloride, n-amyl chloride, dichloropentanes, n-hexyl chloride, monochlorohydrin, dichlorohydrin, epichlorohydrin, glycerol alpha-monochlorohydrin, glycerol alpha,-gamma dichlorohydrins, monobromobenzenes, dibromobenzene, monochlorobenzene, o-dichlorobenzene, trichlorobenzene, d-chloronaphthalene, monoamyl chloronaphthalene, diamyl chloronaphthalene, dichloroethylether, dichlorodiisopropyl ether, triglycol dichloride, halowax oils, dichlorodifluoromethane, difluorochloroethane, fluorodichloromethane, fluorotrichloromethane, trifluorotrichloroethane, dichlorotetrachloroethane, and ethylidene fluoride can be used.

While some polar solvents are miscible with water, mixtures of polar and/or nonpolar solvents containing miscible solvents can be immiscible with water. Polar solvents immiscible with water and immiscible mixtures thereof can be employed, which include alcohols, ketones, ethers, and esters. Alcohols such as methanol, ethanol, n-propanol, isopropanol, n-butanol, isobutanol, sec-butanol, tert-butanol, fusel oil, primary amyl alcohol, pentasol, n-amyl alcohol, sec-amyl alcohol, sec-n-amyl alcohol, methyl amyl alcohol, 2-ethylbutyl alcohol, heptanol-2, heptanol-3, 2-ethylhexanol, capryl alcohol, nonyl alcohol, nonyl alcohol derivatives, diisobutylcarbinol, n-decanol, undecanol, trimethylnonyl alcohol, tetradecanol, heptadecanol, benzyl alcohol, cyclohexanol, methylcyclohexanol, trimethylcyclohexanol, 4-tert-amyl cyclohexyl alcohol, dimethyl tolyl carbinol, ethylene glycol, propylene glycol, diethylene glycol, dipropylene glycol, trimethyl glycol, triethylene glycol, polyethylene glycols, polypropylene glycol 150, 2-methyl-2, 4-pentane-diol, glycerol, terpene alcohol, and alphaterpineol are useful.

Ketones such as methyl acetone, methyl ethyl ketone, methyl n-proply ketone, methyl isobutyl ketone, methyl n-amyl ketone, ethyl butyl ketone, di-n-propyl ketone, methyl hexyl ketone, diisobutyl ketone, diacetone alcohol, acetonyl acetone, cyclohexanone, and methyl cyclohexanone are suitable.

Ethers including isopropyl ether, n-butyl ether, diamyl ether, n-hexyl ether, ethylene glycol monomethyl ether, mono and dialkyl ethers of ethylene glycol and their derivatives marketed by Union Carbide Corporation under the trademark "Cellosolve," ethylene glycol mono-n-butyl-ether, ethylene glycol monophenyl ether, ethylene glycol monobenzyl ether, a series of glycol monoethers marketed by The Dow Chemical Company under the trademarks "Dowanol" 4, 2, 3 and diethylene glycol monomethyl ether, diethylene glycol monoethyl ether, diethylene glycol monobutyl ether, diethyl acetal, 1,2-propylene oxide, 1,4-dioxane, methylal, 2-methyl furan tetrahydrofurane, 2,3-dihydropyran, pentamethylene oxide, trioxane, terpinyl methyl ether, terpinyl ethylene glycol ether, dichloroethyl ether, triglycol dichloride, glyceryl d-monomethyl ether, glyceryl d,$\gamma$-dimethyl ether, glyceryl d-mono-n-butyl ether, glyceryl d,monoisamyl ether, and glyceryl d-diisoamyl ether can be used.

Examples of esters which can be employed are ethyl acetate, n-propyl acetate, isopropyl acetate, n-butyl acetate, sec-butyl acetate, isobutyl acetate, amyl acetate, sec-amyl acetate, pentacetate, methyl amyl acetate, 2-ethyl butyl acetate, cyclohexyl acetate, methyl cyclohexanyl acetate, ethylene glycol monoacetate, glycol diacetate, ethylene glycol monoethyl ether acetate, ethylene glycol monoethyl ether acetate, n-butyl propionate, methyl butyrate, n-butyl butyrate, ethyl hydroxy-iso-butyrate, diethyl carbonate, diethyl oxalate, dibutyl oxalate, and diamyl oxalate.

The preferred solvents for use in the practice of this invention are highly aromatic and have a flash point above 100° F., as highly aromatic solvents tend not to form sludges by precipitating asphaltenes out of crude oils as aliphatic solvents do. A solvent having a high flash point is preferred for reasons of safety.

Generally, suitable surface active agents for use in the practice of this invention are those well known to practioners of the art and include amphoteric, non-ionic, cationic, and anionic surface active agents. Such agents are known to alter the interface between liquid and gas phases or between two immiscible liquid phases. As some surface active agents are effective for altering one type of interface but not another, while other surface active agents are effective for both kinds of interface, the surface active component used in this invention can comprise a single chemical compound or a mixture of compounds.

Among the useful surface active agents are those selected from the group consisting of cocoamide betaine, octylphenoxypolyethoxy ethanol, cocoylamidealkylamine, N-cocotrimethyl-ammonium chloride, bis(2-hydroxyethyl) cocoamine oxide, and sodium laurylsulfoacetate.

Surface active agents are often commercially available as a solution in water or some other solvent at less than 100 percent by weight activity, for example, 30 to 50 percent active. In this discussion, the concentration of the surface active agents is expressed in terms of the total amount of active material in the total liquid phase of the composition. Since the amount of surface active agent employed is small compared to the amount of the aqueous and other components of the foam, the amount of water or other solvent contributed to the foam composition by less than 100 percent active surface active agents is small and is ignored.

It will be understood that surface active agents will vary considerably in effectiveness, depending, for example, on the choice of solvent and aqueous component of the treating composition, as well as on the composition of the connate water and/or crude oil within the well. The effectiveness will also depend on the nature of the surface active agent. As an illustration, anionic surface active agents can usually be used only when their activity as surface active agents is not inhibited by the salt content of the connate water.

Despite the variance to be expected in the efficacy of different surface active agents, it is nevertheless readily ascertainable whether or not a given surface active agent will prove useful for treating a given subterranean formation. In the preferred embodiment, for example, one would blend to form a sample emulsion of about 100 to 150 milliliters in volume a sample of an aqueous component having an ionic strength matching the ionic strength of the connate water in the formation with a sample of the highly aromatic solvent desired for dissolving paraffins and with a sample of the crude oil in the formation to be treated. This mixture is then admixed with a sample of the surface active agent to be tested, and the combined ingredients are then subjected to intense agitation to determine by visual inspection whether or not a stable emulsion forms. Assuming a stable emulsion does form, it is allowed to stand at rest in a graduated cylinder or other suitably elongated vessel to determine if the emulsion separates into two distinct, continuous phases within about 5 to 30 minutes. The time required for an emulsion to separate is a function of the height of the sample undergoing separation. A laboratory sample that is only a few inches high in a one-inch high graduated cylinder separates in between 5 and 30 minutes, but will require between 0.5 and 24 hours to separate in a well where the column of emulsion is several feet in height. An emulsion which has not substantially separated within 30 minutes, therefore, indicates that the time for separation in a well will be so lengthy as to incur undesirable and expensive downtime before production can be resumed. Assuming the emulsion proves satisfactory by these tests, it is then foamed and employed in the reservoir or formation as a foamed emulsion.

If desired, prior to use, the foaming capacity of the emulsion may be determined by first foaming the emulsion, allowing it to stand, and measuring the time required for one half of the liquid in the foamed composition to drain from the foam.

To assure that the well-treating fluid can be readily pumped from the wellbore once the paraffin deposits have been cleaned from the well, the formation, and/or the service vessels and conduits, it is a critical feature of the invention that the surface active agent be provided in an amount that will stabilize the foamed emulsion as an emulsion under conditions of agitation but allow spontaneous breakdown under quiescent conditions, preferably within a period of time not less than about 0.5 hour and not more than 24 hours. The foam will spontaneously die down and the emulsion will substantially separate when the treating fluid is at rest, the separated phases having viscosities substantially less than that of the oil-in-water emulsion. For use in producing wells, dissipation of the foam will facilitate various production operations such as determining fluid levels and pumping. The separated phases can then be quickly and easily produced along with formation fluids from the wellbore without reduced flow potential.

Surface active agents can be found that will effectively enhance formation of a foamed solvent emulsion from a non-acidified aqueous solution formulated to have an ionic strength similar to that of the connate waters in the reservoir to be tested and a hydrocarbon solvent suitable for dissolving paraffins and asphaltenes. The emulsion should foam in the presence of an inert gas component administered under conditions of agitation and should remain a stable foamed emulsion under conditions of agitation, such as injection and circulation through the wellbore, annulus, and surface conduits servicing the well, but the emulsion should remain sufficiently destabilized to spontaneously separate into aqueous-rich and solvent-rich liquid phases when injection of the well-treating fluid has been stopped for a desired period of time, for example, for about half an hour or more, so that the viscosity of the separated phases is substantially less than that of the emulsion.

The foam can be generated by combining the liquid ingredients and the surface active agents in any desired order and introducing the gas into the liquid with agitation. For convenience, a volume of water is usually placed in a suitable mixing container and the desired salts are stirred in to make up the aqueous solution. Next, the surface active agents are mixed into the aqueous solution in any order desired or simultaneously. Next, the organic solvent component is added to the mixing container. While the resulting mixture is agitated, the inert gas is introduced to form the foam. While the foam can be prepared batchwise, it is also possible to prepare it in a continuous operation wherein the aqueous solution and the mixture of surface active agents is introduced into a conduit at the same time as the organic solvent, and the gas is introduced into the conduit as the emulsified mixture passes through it. The composition can be suitably agitated by passing it through a static mixer located in the conduit downstream of the point or points of addition. The foam formed is then delivered to a point of use.

In removing paraffin deposits from wells and the conduits associated therewith, the foam can be introduced into the unit into contact with the paraffin deposits and allowed to stand for a length of time sufficient to remove the deposit. Preferably, however, the foam is continuously passed through the unit, for example, a conduit, during the treatment. In treating wells and/or the surrounding subterranean reservoir, the foam can be introduced to the bottom of the well via a conduit suspended in the well or via the annulus between such a conduit and the sidewall of the well. At the bottom of the well, the foam can be circulated back to the surface or, by applying a pressure to the foam that exceeds the reservoir pressure, the foam can be forced out into the reservoir if desired to dissolve paraffinic plugs that extend radially from the wellbore into the formation. Since the treating fluid preferably contains no acid additive, the danger of depositing iron-bearing mineral deposits at depth into the formation is minimized while swelling of clays is prevented due to the ionic compatibility of the aqueous component of the treating fluid with reservoir waters.

The composition and method of the invention are most advantageously employed when the injected foamed emulsion is allowed, after contact with the paraffinic deposits under agitated conditions, to stand under relatively quiescent conditions so that the emulsion degasses and substantially separates into two liquid phases. These embodiments of the invention take advantage not only of the separation and anti-gelling properties of the foamed emulsion, but also of the relatively low viscosity of the separated liquid phases. An embodiment of the invention which takes advantage of these properties is directed to certain producing wells wherein the emulsion is permitted to stand during the time period separating the dissipation of a gas drive and initiation of a mechanical lift. In a producing well, one may, as described above, employ a foamed emulsion by either of two general methods. The first involves forcing the foamed emulsion under applied pressure into the well and out into the formation, and then recovering the emulsion when the applied pressure is removed and the emulsion is driven back through the well into production. The second, and more preferable method, is to inject the foam into the well, then circulate the foam through the annulus to the surface, with the aid of back pressure from the formation, and, when the treatment is complete, then return the well to production to take advantage of the gas drive provided as the foam breaks down. In either embodiment, it is possible to operate without permitting the foam to stand under relatively quiescent conditions, but in many if not most situations, the foam will stand under relatively quiescent conditions during the time period commencing from the time the energy of the gas drive is depleted until the time a pump or other mechanical lift is employed to remove the emulsion and produced liquids. Since this time period is generally sufficient to permit substantial (and occasionally complete) degassing as well as substantial (and occasionally complete) separation into a two-phase liquid, advantages will be gained in that, first, the separation prevents the emulsion from reacting with formation fluids to form gels or other highly viscous materials, and second, the viscosity of the two-phase liquid is substantially lower than that of the original emulsion. These two advantages allow for ready removal of the injected well-treating fluid, using ordinary pumps and the like.

In another embodiment of the invention, when the composition and/or method of this invention is used to remove paraffin deposits from depleted stripper wells, a technique employing a lower pressure on the circulating treating fluid in the wellbore than exists in the formation, for example, between about 10 and 1,500 p.s.i.g. lower, preferably 100 to 500 p.s.i.g. lower, can be used to dissolve paraffin deposits without danger of blowouts. The particular advantage of this technique is that the higher formation pressure will inhibit penetration of the treating composition into the formation and will prevent insoluble components of the paraffinic sludge from remaining once paraffin and asphaltene components have been dissolved from the deposit plugging the formation by blowing them out of the face of the wellbore and into the circulating treating fluid.

In yet another embodiment, the foamed emulsion is used to clean paraffin deposits from industrial units such as the tubing of heat exchangers and conduits by contacting the deposits with the foamed emulsion, preferably under conditions of agitation.

The invention is further illustrated by the following examples which are illustrative of various aspects of the invention and are not intended as limiting the scope of the invention as defined by the appended claims.

EXAMPLES 1 TO 24

To test the foaming, emulsifying, and self-breaking tendencies of foamed emulsion compositions stabilized by the surface active agents of this invention, a series of tests are conducted. Each composition comprising an aqueous solution, a solvent and one or more surface active agents is tested first as an emulsion to determine its stability and the rate at which the phases separate upon standing. Then the emulsion is foamed by stirring in air, and the height and drain half life of the foam are determined to test the stability of the foam. Into some samples of the composition, a portion of crude oil contaminant is added to ascertain whether contact of the well-treating fluid with the standing column of oil in the reservoir will adversely affect its foaming, emulsifying and self-breaking tendencies.

More particularly, a measured quantity of surface active agent is placed into a close-topped graduated cylinder to which is added a sufficient amount of an aqueous solution containing 3 percent by weight of potassium chloride to fill the graduated cylinder to the 70 milliliter mark. Then Super High Flash Naphtha, an aromatic solvent having a flash point between 100° and 200° F. manufactured by Union Oil Company, Chemicals Division, is added to the aqueous mixture in an amount sufficient to fill the cylinder up to the 100 milliliter mark. The cylinder is closed and shaken to disburse the surfactant into the solvating phases and the mixture is allowed to stand for one minute. Then the mixture is shaken again exactly 25 times and allowed to stand.

The absence or appearance of an interface between the aqueous and organic solvent phases is noted and the position of the interface as it moves up the height of the cylinder is recorded at timed intervals of 1 minute, 5 minutes, 15 minutes, 30 minutes and, occasionally again after an interval of 24 hours from the time the mixture was last agitated. In all cases, the sharpness of the interface is noted. The slower the vertical movement of the interface up the height of the graduated cylinder, the more stable the emulsion.

To test for the stability of the test mixtures as a foam, the content of each graduated cylinder is poured into an 800 milliliter beaker and stirred vigorously with a manually operated egg beater for 2 minutes to form a foam. The resulting foam is then transferred into a 500-milliliter graduated cylinder having a diameter of about 4.6 centimeters. To determine the drain half-life of the foam, the time required for one-half the liquid volume to drain from the foam is recorded. If no crude oil has been added to the mixture, the drain half-life will be the time required for 50 milliliters to drain from the mixture. If crude oil has been added, the drain half-life will be the time required for 50 milliliters plus one half the amount of the added crude to drain from the mixture. The longer the drain half-life, the more stable the foamed emulsion. The height of the foam in the cylinder is also recorded. A high-rising foam indicates ease of foaming.

Surface active agents in the amounts indicated below in Table I were used alone or in combination in Tests 1 to 24 to generate foamed emulsions according to the laboratory procedures set forth hereinabove.

TABLE I

| Agent Designation | Type | Formula | Activity %* |
|---|---|---|---|
| A | Amphoteric | Cocoamide betaine | 45 |
| B | Non-ionic | Octylphenoxypolyethoxy ethanol | 100 |
| C | Cationic | Cocoylamidealkylamine | 50 |
| D | Cationic | N—Cocotrimethyl-ammonium chloride | 50 |
| E | Cationic | bis(2-hydroxyethyl)-cocoamine oxide | 50 |
| F | Anionic | Sodium laurylsulfoacetate | 70 |

*Percent active ingredient by weight in water.

In Table II, the results obtained in Tests 7 to 24 using various combinations of the surface active agents are compared with the results attained in Tests 1 to 6 by using each of the surface active agents alone. Agents A, C, and D are capable of generating suitably stable emulsions when used alone, and foams of these emulsions exhibit the greatest height of any produced by the surface active agents tested as well as possessing drain half-lives unsurpassed by any of the two component combinations used in Tests 7 to 18. Agent A is amphoteric and agents C and D are cationic. On the other hand, agent B, the non-ionic agent, although useful for preparing a highly stable emulsion, is inferior when used alone as a foaming agent. Agent F, the anionic agent, is not suitable as either an emulsifying or a foaming agent.

However, as is seen in Tests 13 to 18, agent B possesses the characteristic, when used in combination with agents A, C, and D, of tending to stabilize the emulsions and destabilize the foams, the latter of which are seriously impaired both in maximum foam height and in drain half-life. When agent B is used in combination with agent E, the results are somewhat contradictory. Comparison of the results of Tests 5 and 16 shows that foam height is slightly increased but drain half-life is slightly decreased when agent B is added to agent E.

In Tests 7 to 10, as the proportion of agent B added in combination with agent A, C, D, or E is increased, the stability of the emulsion is correspondingly increased. When 0.35 milliliter of B is used in combination with 0.75 to 1.0 milliliter of A, C, D, or E, the rate at which the phases separate upon standing is greater than when 0.7 milliliter of agent B is used in combination with the same amounts of A, C, D, or E in Tests 13 to 16.

In the preferred practice of this invention, surface active agents should be chosen so as to promote a high foaming, well-formed emulsion under conditions of agitation but so as to allow rapid breakdown of the foam and spontaneous separation of the emulsion once circulation has stopped. As illustrated in Tests 7 to 24, a combination of surface active agents can be readily found that does not, on the one hand, overly stabilize the emulsion and thereby hinder its self-breaking characteristic or, on the other hand, overly depress the foam generating characteristics of the mixture. The results of these experiments indicate that generally in combinations of surface active agents the proportion of agent B, or other similar non-ionic surface active agent, to agents having ionic charges should not be greater than the ratios between 1:0.1 and 1:0.5 by volume for best self-breaking characteristics in the emulsion.

The results of Tests 19 to 24, which incorporate 5 milliliters of crude oil into the aqueous-solvent emulsions, demonstrate that agents A, B, and D form stable emulsions possessing good foaming and self-breaking characteristics in the presence of crude oil. Agent E, the cationic surface active agent, on the other hand, tends to overly stabilize the emulsion in the presence of crude oil, thereby hindering its self-breaking characteristics. And agent F, the anionic agent, prevents foaming. These tests illustrate that for the characteristics desired in the combination of this invention, when the reservoir possesses the crude oil and connate waters similar to those used in these tests surface active agents such as A, D, and B should be used, while anionic surface active agents such as agent F should be avoided, especially in compositions having potassium ions or similarly acting ions in solution.

active agents, such as agent F, the presence of ionic components such as potassium chloride in a concentration as high as 3 percent by weight of the aqueous solution prevents foaming. It may be concluded, therefore, that agent F, and other similar acting anionic surface active agents, can prove effective for the practice of this invention when used in mixtures containing aqueous components of very little ionic strength, despite their ineffectiveness in mixtures containing as much as 3 percent by weight of potassium chloride.

TABLE III

FOAMING CHARACTERISTICS OF SURFACE ACTIVE AGENTS

| Surface Active Agent | Drain ½-Life | Maximum Foam Height (cm) |
|---|---|---|
| 2.0 ml A | 1'25" | 22.0 |
| 0.7 ml B | 54" | 25.3 |
| 1.5 ml C | 1'10" | 24.8 |
| 1.5 ml D | 1'45" | 27.8 |
| 1.5 ml E | 3'45" | 32.2 |
| 1 gm F | No Foam | No Foam |
| 1 gm F* | 6'56" | 34.2 |

*Distilled water replaced the aqueous solution of 3 wt. % KCL in this mixture.

TABLE II

EMULSION AND FOAM STABILITY TEST

| TEST NO. | SURFACE ACTIVE AGENTS | EMULSION TESTS INTERFACE DESCRIPTION | INTERFACE HEIGHT IN cm** AT TIME IN MINUTES** | | | | FOAM STABILITY TESTS | |
|---|---|---|---|---|---|---|---|---|
| | | | 1 | 5 | 15 | 30 | DRAIN ½-LIFE (min) | MAXIMUM*** FOAM HEIGHT (cm) |
| 1 | 2 ml A | Sharp | 1.81 | 8.6 | 11.3 | 12.1 | 2' 45" | 23.1 |
| 2 | 0.7 ml B | Barely Detect | 0.4 | 1.8 | 4.9 | 9.2 | 0' 15" | 13.8 |
| 3 | 1.5 ml C | Sharp | 1.1 | 6.0 | 10.6 | 11.3 | 2' 30" | 24.8 |
| 4 | 1.5 ml D | Sharp | 1.5 | 6.0 | 11.0 | 12.1 | 3' 00" | 28.9 |
| 5 | 1.5 ml E | Sharp | 0.8 | 3.6 | 7.0 | 11.0 | 1' 25" | 19.8 |
| 6 | 1 gm F | Sharp | 10.4 | 10.6 | 10.6 | 10.8 | No Foam | No Foam |
| 7 | 1 ml A, 0.35 ml B | Sharp | 0.2 | 1.5 | 6.2 | 9.7 | — | — |
| 8 | 0.75 ml C, 0.35 ml B | Sharp | 0.9 | 4.0 | 10.2 | 11.0 | — | — |
| 9 | 0.75 ml D, 0.35 ml B | Sharp | 0.9 | 4.8 | 10.8 | 11.3 | — | — |
| 10 | 0.75 ml E, 0.35 ml B | Sharp | 0.8 | 2.2 | 6.6 | 10.2 | — | — |
| 11 | 0.5 gm F, 0.35 ml B | Barely Detect | 0.2 | 2.0 | 5.1 | 10.2 | — | — |
| 12 | 1 ml A, 0.75 ml D | Sharp | 1.6 | 9.0 | 11.7 | 12.4 | — | — |
| 13 | 1 ml A, 0.7 ml B | Sharp | 0.2 | 1.8 | 4.9 | 9.2 | 0' 35" | 17.9 |
| 14 | 0.75 ml C, 0.7 ml B | Sharp | 0.3 | 2.4 | 6.6 | 8.1 | 0' 30" | 14.3 |
| 15 | 0.75 ml D, 0.7 ml B | Sharp | 0.3 | 3.3 | 8.4 | 10.2 | 0' 10" | 15.1 |
| 16 | 0.75 ml E, 0.7 ml B | Barely Detect | 0.2 | 1.5 | No | No[1] | 0' 07" | 20.4 |
| 17 | 0.5 gm F, 0.7 ml B | Barely Detect | 0.2 | 0.8 | No | No[2] | No Foam | No Foam |
| 18 | 1 ml A, 0.75 ml D, 0.35 ml B | Sharp | 0.8 | 2.9 | 8.6 | 10.6 | 0' 05" | 11.0 |
| 19 | 1 ml A, 0.7 ml B, 5 ml W* | — | 0.8 | 2.4 | 5.9 | 9.3 | 3' 28" | 20.6 |
| 20 | 0.75 ml B, 0.7 ml B, 5 ml W | — | 0.4 | 1.6 | 4.6 | 8.2 | 1' 17" | 15.1 |
| 21 | 0.75 ml D, 0.7 ml B, 5 ml W | — | .9 | 1.5 | 6.2 | 9.2 | 0' 07" | 13.2 |
| 22 | 0.75 ml E, 0.7 ml B, 5 ml W | — | ND | ND | 0.9 | 1.6 | 3' 40" | 17.6 |
| 23 | 0.5 gm F, 0.7 ml B, 5 ml W | — | .8 | 2.4 | 7.3 | 12.1 | No Foam | No Foam |
| 24 | 1 ml A, 0.75 ml D, 0.7 ml B, 5 ml W | — | .4 | 1.8 | 4.6 | 8.4 | 7' 35" | 27.5 |

[1]24 hours - interface height 9.1 cm
[2]24 hours - interface height 12.1 cm
*W stands for crude oil
**Graduated Cylinder - 100 ml. 2.3 × 18.3 cm (@ 100 ml)
***Graduated Cylinder - 500 ml. 4.6 × 27.5 (@ 500 ml)

EXAMPLES 25 TO 31

In Tests 25 to 30, the foaming characteristics of surface active agents dissolved in an aqueous solution containing 3 percent by weight of potassium chloride but no aromatic solvent are compared. The results of these tests summarized in Table III show that compositions containing agents A, C, and D produce less stable foams in the absence of the solvent component, while agents B and E produce more-stable foams as measured by drain half-life.

In Test 30, the saline solution to which agent F is added produces no foam, but as Test 31 shows, addition of the same amount of agent F to distilled water produces excellent foaming capability. For anionic surface The effectiveness of surface active agents used in the practice of this invention will be influenced by the chemical properties of the aqueous and solvent components of the emulsion and of the crude oil in place in the reservoir. For best results, therefore, surface active agents should be selected using an emulsion made from (1) a solvent component for dissolving paraffins and asphaltenes, (2) a sample of crude oil from the reservoir to be tested, and (3) an aqueous component formulated to match the ionic strength of the connate waters of the reservoir to be tested. Alternatively, a sample of connate waters withdrawn from the reservoir can be used as the aqueous phase if such waters are to be used as the aqueous component of the emulsion. The surface active agent should be chosen so as to ensure stability of the emulsion such that not more than about 50 volume percent of the total emulsion separates into a substantially continuous lower liquid phase within 15 minutes from the time that agitation of the emulsion has stopped. When beaten for two minutes, foam of an emulsion having the abovedescribed stability should also have a drain half life of not ess than 0.5 minute.

Establishing the chemical environment during experimentation in which the surface active agents will function during use will enable one skilled in the art to select a surface active agent or combination of surface active agents that will impart to the well-treating composition as closely as possible the characteristics desired, such as the time the emulsion should require to separate into two liquid phases after circulation or agitation has ceased. For example, if routine or emergency shutdown of the facilities circulating the treating fluid is anticipated for brief periods of time, it may be desirable to formulate a treating solution for which breakdown of the emulsion is less rapid than would be desired if no stoppage of circulation is anticipated.

The well-treating fluid and process for its use as above described provide significant advantages. Unlike a water-free foamed solvent, which can change drastically in rheological character when contacted by connate water, the foamed oil-in-water emulsion of this invention maintains a substantially uniform viscosity despite contact with connate water so long as the fluid is agitated. And under quiescent conditions, the foamed emulsion spontaneously separates into two liquid phases of lower viscosity than the emulsion.

A second advantage of the oil-in-water emulsion lies in the protection the exterior phase affords to the solvent droplets against contamination by oil in the reservoir during placement of the treating fluid into the lower regions of the wellbore where paraffin deposits usually accummulate. Unlike the water-in-oil emulsion, therefore, the oil-in-water emulsion insulates the solvent against dilution by oil in the reservoir.

On the other hand, the non-formation damaging aqueous component of the foamed solvent emulsion of this invention offers further advantages for use with iron or clay-containing formations. Containing a non-acidified aqueous component, the preferred foamed emulsion prevents dissolution of iron-bearing materials and, therefore, prevents resultant deposition of iron-containing compounds that would reduce formation permeability. Moreover, the preferred aqueous component used in the emulsion in this invention does not damage the clays in the reservoir. To avoid clay swelling that impairs permeability, the aqueous component is formulated to match the ionic strength of connate waters in place. Therefore a foamed emulsion containing a non-acidified, ionically compatible aqueous component has specific advantages for use in iron or clay-bearing formations.

Although this invention has been described in conjunction with a preferred embodiment thereof, it is evident that many alternatives, modifications, and variations will be apparent to those skilled in the art in light of the foregoing description. Accordingly, it is intended to embrace all such alternatives, modifications, and variations that fall within the scope of the claims.

We claim:

1. A process for removing paraffinic hydrocarbon deposits from subterranean locations penetrated by a wellbore, said process comprising (1) preparing a foamed emulsion remote from said subterranean locations and (2) injecting said foamed emulsion into said wellbore, said emulsion comprising (a) an organic solvent for paraffins, (b) an aqueous liquid component, (c) an inert gas, and (d) a surface active agent.

2. A process as defined in claim 1 where said foamed emulsion is prepared near or at the surface of the earth penetrated by said wellbore, and said emulsion is injected from the location of preparation into said wellbore.

3. A method for removing paraffinic hydrocarbon deposits from subterranean locations penetrated by a wellbore, said method comprising injecting into the wellbore a treating composition comprising a foamed oil-in-water emulsion, which emulsion comprises (a) an organic solvent for paraffins, (b) an aqueous liquid component, (c) an inert gas, and (d) sufficient of a surface active agent to maintain said composition as a foamed oil-in-water emulsion under conditions of agitation, but to allow spontaneous degassing and separation of said composition into two substantially continuous liquid phases upon standing.

4. The method of claim 3 wherein the surface active agents are selected from the group consisting of cocoamide betaine, octylphenoxypolyethoxyethanol, cocoylamidealkylamine, and N-cocotrimethylammonium chloride.

5. The method defined in claim 4 wherein the solvent for paraffins comprises a substantial proportion of aromatic components and has a flash point above about 100° F.

6. The method defined in claim 3 wherein the aqueous component is recycled connate water removed from said well.

7. The method defined in claim 3 wherein the subterranean location is a depleted stripper well which has a substantially reduced formation pressure and the treating fluid is circulated in step (2) at a pressure between about 10 and 1,500 p.s.i.g. below the pressure in the formation.

8. The method defined in claim 7 wherein solid insoluble components of paraffin deposits from which the paraffinic components have been dissolved away are blown into and carried away by the circulating treating fluid in step (3) due to the difference in pressure between the higher formation pressure and the lower treating fluid pressure.

9. The method defined in claim 3 wherein the ionic concentration of the aqueous component is formulated to match the ionic concentration of the reservoir to be treated.

10. The method defined in claim 3 wherein the treating composition is not acidic.

11. The method defined in claim 3 wherein in a producing well said treating composition is (1) forced under applied pressure into a subterranean formation penetrated by the wellbore, (2) recovered at least in part when the applied pressure is removed while taking advantage of gas drive provided by degassing of said composition, and (3) produced along with other produced fluids upon dissipation of the gas drive with the aid of a mechanical lift.

12. The method defined in claim 3 wherein in a producing well said treating composition is circulated through the annulus to dissolve at least a portion of said paraffinic deposits and then the well is returned to production while taking advantage of the gas drive provided by degassing of said composition.

13. The method defined in claim 3 wherein in a producing well said treating composition is (1) circulated through the annulus to dissolve at least a portion of said paraffinic deposits, (2) allowed to degas while the well is returned to production so that advantage is taken of the gas drive provided by degassing of said composition, (3) allowed to stand under relatively quiescent conditions for a time sufficient to permit substantial separation into a two-phase liquid, and (4) produced along with other produced fluids by aid of a mechanical lift.

14. The method defined in claim 13 wherein the mechanical lift comprises a pump.

15. The method defined in claim 13 wherein the viscosity of the two-phase liquid is substantially lower than that of the original emulsion.

16. A method for removing paraffinic hydrocarbon deposits from subterranean locations penetrated by a wellbore, said method comprising:
 (1) injecting into the wellbore a treating composition comprising (a) a continuous non-acidic aqueous phase having non-reservoir-damaging properties, (b) a discontinuous solvent phase immiscible with said aqueous phase, said solvent being effective for dissolving paraffins, (c) a discontinuous gaseous phase comprising inert gas, and (d) sufficient of a surface active agent selected to maintain said composition as an emulsion under conditions of agitation but to allow separation of the composition into two substantially continuous liquid phases under conditions of quiescence;
 (2) contacting the paraffinic deposits with the treating composition under agitated conditions for a period of time sufficient to effect at least some dissolution thereof; and
 (3) removing the treating composition containing said dissolved paraffinic deposits.

17. The method of claim 16 wherein the surface active agents are selected from the group consisting of cocoamide betaine, octylphenoxypolyethoxyethanol, cocoylamidealkylamine, and N-cocotrimethylammonium chloride.

18. The method defined in claim 17 wherein the aqueous component is recycled connate water removed from said well.

19. The method defined in claim 17 wherein the solvent for paraffins comprises a substantial proportion of aromatic components and has a flash point above about 100° F.

20. The method defined in claim 17 wherein the solvent for paraffins comprises a substantial proportion of aromatic components and has a flash point above about 100° F.

21. The method defined in claim 16 wherein the well is a depleted stripper well having a substantially reduced formation pressure and the treating fluid is circulated in step (2) at a pressure between about 10 and 1,500 p.s.i.g. below the pressure in the formation.

22. The method defined in claim 21 wherein solid insoluble components of paraffin deposits from which the paraffinic components have been dissolved away are blown into and carried away by the circulating treating fluid in step (3) due to the difference in pressure between the higher formation pressure and the lower treating fluid pressure.

23. The method defined in claim 21 wherein solid insoluble components of paraffin deposits from which the paraffinic components have been dissolved away are blown into and carried away by the circulating treating fluid in step (2) due to the difference in pressure between the higher formation pressure and the lower treating fluid pressure.

24. The method defined in claim 16 wherein the paraffinic deposits contacted in step (2) are in formation rock and the treating fluid penetrates said formation rock during step (2) sufficiently to dissolve paraffin deposits plugging the pores of said formation rock without damage to said formation rock.

25. The method defined in claim 16 wherein the ionic concentration of the aqueous component is formulated to match the ionic concentration of the reservoir to be treated.

26. The method defined in claim 16 wherein the treating composition is not acidic.

27. The method defined in claim 16 wherein the treating composition separates into two substantially continuous liquid phases no sooner than half an hour or more after agitation is stopped.

28. The method defined in claim 16 wherein the subterranean location is a depleted stripper well which has a substantially reduced formation pressure and the treating fluid is circulated in step (2) at a pressure between about 100 and 500 p.s.i.g. below the pressure in the formation.

29. The method defined in claim 16 wherein the paraffinic deposits contacted in step (2) are in formation rock and the treating fluid penetrates said formation rock sufficiently to dissolve paraffin deposits plugging the pores of said formation rock without damage to said formation rock.

30. The method defined in claim 16 wherein the ionic concentration of the aqueous component is formulated to match the ionic concentration of the reservoir to be treated.

31. The method defined in claim 16 wherein the treating composition is not acidic.

32. The method defined in claim 16 wherein the treating composition separates into two substantially continuous liquid phases no sooner than half an hour or more after agitation is stopped.

33. The method defined in claim 16 wherein in a producing well said treating composition is injected in step (1) under applied pressure into a subterranean formation penetrated by the wellbore, and removed in step (3) by (a) recovering a portion of said treating composition while taking advantage of gas drive provided by degassing of said composition, and (b) recovering a second portion along with other produced fluids upon dissipation of the gas drive with the aid of a mechanical lift.

34. The method defined in claim 16 wherein in a producing well said treating composition is contacted in step (2) by circulation through the annulus to dissolve at least a portion of said paraffinic deposits and then removed from the well in step 3 by returning the well to production while taking advantage of the gas drive provided by degassing of said composition.

35. The method defined in claim 16 wherein in a producing well said treating composition is injected in step (1), contacted in step (2) by circulating through the annulus to dissolve at least a portion of said paraffinic deposits, and removed in step (3) by (a) recovering a portion of said treating composition by degassing while the well is returned to production so that advantage is taken of the gas drive provided by degassing of said composition, (b) allowing the treating composition to stand under relatively quiescent conditions for a time sufficient to permit substantial separation into a two-phase liquid, and (c) recovering said treating composition along with other produced fluids by aid of a mechanical lift.

36. The method defined in claim 35 wherein the mechanical lift comprises a pump.

37. The method defined in claim 35 wherein the viscosity of the two-phase liquid is substantially lower than that of the original emulsion.

38. A method for removing paraffinic hydrocarbon deposits from subterranean locations penetrated by a wellbore, said method comprising:
(1) injecting into the wellbore a treating composition comprising (a) an organic solvent for paraffins and asphaltenes, (b) a nonacidic aqueous liquid containing not less than 2,000 ppm by weight of dissolved ionic components, and sufficient of a surface active agent selected to maintain a stable foamed emulsion under conditions of agitation while allowing said foamed emulsion to degas and separate into two substantially continuous liquid phases under relatively quiescent conditions;
(2) contacting the paraffinic deposits with the treating composition under agitated conditions for a period of time sufficient to effect at least some dissolution thereof; and
(3) removing the treating composition from the wellbore.

39. The method of claim 38 wherein the surface active agents are selected from the group consisting of cocoamide betaine, octylphenoxypolyethoxyethanol, cocoylamidealkylamine, and N-cocotrimethylammonium chloride.

40. The method defined in claim 17 wherein the aqueous component is recycled connate water removed from said well.

41. The method defined in claim 38 wherein in a producing well said treating composition is (1) forced under applied pressure into a subterranean formation penetrated by the wellbore, (2) recovered at least in part when the applied pressure is removed while taking advantage of gas drive provided by degassing of said composition, and (3) produced along with other produced fluids upon dissipation of the gas drive with the aid of a mechanical lift.

42. The method defined in claim 38 wherein in a producing well said treating composition is circulated through the annulus to dissolve at least a portion of said paraffinic deposits and then the well is returned to production while taking advantage of the gas drive provided by degassing of said composition.

43. The method defined in claim 38 wherein in a producing well said treating composition is (1) circulated through the annulus to dissolve at least a portion of said paraffinic deposits, (2) allowed to degas while the well is returned to production so that advantage is raken of the gas drive provided by degassing of said composition, (3) allowed to stand under relatively quiescent conditions for a time sufficient to permit substantial separation into a two-phase liquid, and (4) produced along with produced fluids by aid of a mechanical lift.

44. The method defined in claim 43 wherein the mechanical lift comprises a pump.

45. The method defined in claim 43 wherein the viscosity of the two-phase liquid is substantially lower than that of the original emulsion.

46. A process for removing paraffinic hydrocarbon deposits from subterranean locations penetrated by a wellbore, said process comprising injecting into the wellbore a foamed emulsion comprising an organic solvent for paraffins and a non-acidic aqueous liquid containing not less than 2,000 ppm by weight of dissolved ionic components, and sufficient of a surface active agent selected to maintain the stability of said foamed emulsion under conditions of agitation while allowing said foamed emulsion to degas and separate into two substantially continuous liquid phases under relatively quiescent conditions.

47. The process of claim 46 wherein a 100 to 150 milliliter sample of said emulsion formed of said aqueous liquid, solvent, and surface active agent under conditions of agitation undergoes separation, while standing as an elongated column of liquid of about 15 centimeters height, of between about 5 and 50 volume percent of said emulsion into a substantially continuous lower liquid phase within about 5 minutes from the time that agitation of the emulsion has stopped, while a foamed emulsion formed by vigorously stirring the inert gas into said emulsion has a drain half-life of not less than 0.5 minute.

48. A process as defined in claim 47 wherein said process further comprises contacting the paraffinic deposits with the foamed emulsion under agitated conditions for a period of time sufficient to effect at least some dissolution thereof, and recovering the treating composition along with other produced fluids from the wellbore without reduction in flow potential.

49. A process as defined in claim 46 wherein said process further comprises contacting the paraffinic deposits with the foamed emulsion under agitated conditions for a period of time sufficient to effect at least some dissolution thereof, and recovering the treating composition along with other produced fluids from the wellbore without reduction in flow potential.

50. A process for removing paraffinic hydrocarbon deposits from subterranean locations penetrated by a wellbore, said process comprising injecting into the wellbore a composition comprising: (1) a continuous non-acidic aqueous phase having non-reservoir damaging properties, (2) a discontinuous solvent phase immiscible with said aqueous phase, said solvent being effective for dissolving paraffins, (3) a discontinuous gaseous phase comprising inert gas, and (4) sufficient of a surface active agent selected to maintain said composition as an emulsion under conditions of agitation but to allow separation of the composition into two substantially continuous liquid phases under conditions of quiescence.

51. A process for removing paraffinic hydrocarbon deposits from subterranean locations penetrated by a wellbore, said process comprising injecting into the wellbore a treating composition comprising: (1) a continuous non-acidic aqueous phase having non-reservoir damaging properties, (2) a discontinuous solvent phase immiscible with said aqueous phase, said solvent being a substantially aromatic solvent effective for dissolving paraffins and possessing a boiling point above about 100° F., (3) a discontinuous gaseous phase comprising inert gas, and (4) sufficient of a surface active agent selected to maintain said composition as an emulsion under conditions of agitation but to allow separation of the composition into two substantially continuous liquid phases under conditions of quiescence.

52. A process as defined in claim 51 wherein said process further comprises contacting the paraffinic deposits with the treating composition under agitated conditions for a period of time sufficient to effect at least some dissolution thereof, and recovering the treating composition along with other produced fluids from the wellbore without reduction in flow potential.

53. A process for removing paraffinic hydrocarbon deposits from subterranean locations penetrated by a wellbore, said process comprising injecting into the wellbore a well treating composition formed by a process comprising: (1) emulsifying finely divided droplets of a hydrocarbon-dissolving solvent in a continuous aqueous phase having non-reservoir damaging properties to form an oil in water emulsion, and (2) forming a stable foam from said emulsion by turbulently contacting said foam with a stream of inert gas, the foamed emulsion maintaining stability under conditions of agitation and undergoing relatively rapid and substantial breakdown into two liquid phases under conditions of rest.

54. A process as defined in claim 53 wherein said process further comprises contacting the paraffinic deposits with the treating composition under agitated conditions for a period of time sufficient to effect at least some dissolution thereof, and recovering the treating composition along with other produced fluids from the wellbore without reduction in flow potential.

55. A process for removing paraffinic hydrocarbon deposits from industrial equipment, said process comprising contacting said deposits with a foamed emulsion comprising an organic solvent for paraffins and a non-acidic aqueous liquid containing dissolved ionic components, and sufficient of a surface active agent selected to maintain the stability of said foamed emulsion under conditions of agitation while allowing said foamed emulsion to degas and separate into two substantially continuous liquid phases under relatively quiescent conditions.

56. A process as defined in claim 55 wherein the industrial equipment comprises a heat exchanger.

* * * * *

UNITED STATES PATENT OFFICE
CERTIFICATE OF CORRECTION

Patent No. 4,614,236    Dated September 30, 1986

Inventor(s) David R. Watkins and Edward J. O'Donnell

It is certified that error appears in the above-identified patent and that said Letters Patent are hereby corrected as shown below:

On the title page insert
[56]  References Cited
      U.S. Patent Documents
      3,572,439   3/1971   Hutchinson et al.

Column 18, line 38 (claim 29), after "rock" but before "sufficiently" insert -- during step (2) --.

Signed and Sealed this

Third Day of March, 1987

*Attest:*

DONALD J. QUIGG

*Attesting Officer*    *Commissioner of Patents and Trademarks*